(12) United States Patent
Reddy et al.

(10) Patent No.: US 8,181,825 B2
(45) Date of Patent: May 22, 2012

(54) HYGIENIC BEVERAGE MIXING AND WHIPPING ASSEMBLY

(75) Inventors: Bala Reddy, Ridgefield, CT (US);
Eugene Scoville, New Milford, CT (US);
Brian P. Tulley, Thomaston, CT (US)

(73) Assignee: Nestec S.A., Vevey (CH)

( * ) Notice: Subject to any disclaimer, the term of this patent is extended or adjusted under 35 U.S.C. 154(b) by 1162 days.

(21) Appl. No.: 11/054,307

(22) Filed: Feb. 8, 2005

(65) Prior Publication Data
US 2006/0175351 A1 Aug. 10, 2006

(51) Int. Cl.
*B67D 1/08* (2006.01)
(52) U.S. Cl. .......... 222/148; 222/1; 222/145.6; 366/343
(58) Field of Classification Search ............... 222/145.2, 222/148, 129.3, 113, 1, 129.1, 134, 145.6, 222/145.5; 239/112; 137/238; 141/107, 141/369; 366/343, 164.4
See application file for complete search history.

(56) References Cited

U.S. PATENT DOCUMENTS

| | | | |
|---|---|---|---|
| 739,788 A | 9/1903 | Morcom et al. | |
| 924,566 A | 6/1909 | Morcom | |
| 3,382,897 A * | 5/1968 | Skiera et al. | 141/107 |
| 4,194,651 A * | 3/1980 | Martin et al. | 222/108 |
| 4,331,299 A | 5/1982 | Culbertson et al. | |
| 4,465,210 A | 8/1984 | Iwanami | |
| 4,676,401 A * | 6/1987 | Fox et al. | 222/1 |
| 4,694,737 A * | 9/1987 | Wittlinger | 99/279 |
| 4,848,381 A | 7/1989 | Livingston et al. | |
| 5,134,925 A * | 8/1992 | Bunn et al. | 99/289 R |
| 5,226,565 A | 7/1993 | Hladis et al. | |
| 5,329,950 A * | 7/1994 | Barinas | 134/95.3 |
| 5,344,073 A | 9/1994 | Waryu et al. | |
| 5,503,064 A | 4/1996 | Scheel et al. | |
| 5,503,179 A | 4/1996 | Till | |
| 5,773,067 A | 6/1998 | Freychet et al. | |
| 5,783,245 A | 7/1998 | Simpson, II | |
| 5,855,295 A | 1/1999 | Lee | |
| 5,918,768 A * | 7/1999 | Ford | 222/113 |
| 6,024,252 A | 2/2000 | Clyde | |
| 6,161,558 A | 12/2000 | Franks et al. | |
| 6,240,952 B1 * | 6/2001 | Schroeder | 137/240 |
| 6,287,515 B1 | 9/2001 | Koosman et al. | |
| 6,446,659 B2 | 9/2002 | Schroeder | |
| 6,564,698 B2 | 5/2003 | Rolland | |
| 6,729,753 B2 * | 5/2004 | Artman et al. | 366/164.6 |

(Continued)

FOREIGN PATENT DOCUMENTS

| | | |
|---|---|---|
| DE | 94 01 472.8 | 5/1994 |
| DE | 199 55 195 | 5/2001 |
| EP | 0 245 641 | 11/1987 |
| EP | 0280245 | 8/1988 |
| EP | 0 579 051 | 1/1994 |

(Continued)

OTHER PUBLICATIONS

A Communication from the European Patent Office discussing the relevance of US 5,773,067 and US 2004/118291.

*Primary Examiner* — Kevin P Shaver
*Assistant Examiner* — Melvin Cartagena
(74) *Attorney, Agent, or Firm* — K&L Gates LLP

(57) ABSTRACT

The present invention is directed to a beverage dispenser and more specifically to an assembly within the dispenser for mixing beverage components and optionally whipping the beverage product into a foam. The assembly includes a cleaning system that provides for cleaning of the surfaces that contact the beverage product or its components.

24 Claims, 5 Drawing Sheets

U.S. PATENT DOCUMENTS

| | | |
|---|---|---|
| 7,182,017 B1 * | 2/2007 | Knepler et al. ............... 99/279 |
| 2002/0074350 A1 | 6/2002 | Jones et al. |
| 2004/0118291 A1 | 6/2004 | Carhuff et al. |
| 2005/0098575 A1 * | 5/2005 | Carhuff et al. ............ 221/150 R |

FOREIGN PATENT DOCUMENTS

| | | |
|---|---|---|
| FR | 2 649 687 | 1/1991 |
| GB | 1004814 | 9/1965 |
| GB | 2 367 105 | 3/2002 |

* cited by examiner

HYGIENIC BEVERAGE MIXING AND WHIPPING ASSEMBLY

BACKGROUND OF THE INVENTION

In the restaurant industry beverages that require mixing are often prepared by beverage dispensers which quickly add two or more ingredients together in a mixing bowl, mix these ingredients and dispense the mixed product. Concentrated beverages, and/or syrups and dairy products can be mixed and, under some circumstances, are whipped into a foam and dispensed for consumption by the consumer. Surfaces that contact the product in a beverage dispenser, require regular cleaning to prevent the build up of food deposits. Cleanliness is all the more important in dispensers that prepare beverages that include dairy products because residual amounts of dairy products encourage bacterial growth and quickly decompose into poor tasting, inedible products having a putrid smell.

Beverage dispensers that handle milk based components, especially those that whip beverages into a foam, require regular and thorough cleaning with appropriate cleaning solutions to remove residues that gradually accumulate in tubing and the mechanical parts of the dispenser assembly. If done manually, the process is labor intensive and time consuming. Some cleaning processes require disassembly and re-assembly of the dispensing machine. In addition to the time required to clean such machines, neglect or error in the cleaning process can affect beverage quality and can lead to serious health hazards.

Beverage dispensers have been designed that provide for cleaning of surfaces while they remain in-place in the dispenser. US 2004/0118291, which is incorporated herein by reference, describes an automated dispenser comprising an interface connection configured to establish a supply of a milk-based fluid from a reservoir (for example a container or bag), a mixing device configured to receive the milk-based fluid (e.g., a milk liquid concentrate) and prepare a milk-based product (e.g., a cappuccino or latte type beverage), a nozzle in fluid association with the mixing device for dispensing the milk-based product, a product flowpath configured for directing the milk-based product to flow from the interface connection through the mixing device to the nozzle, and a clean-in-place flowpath assembly. The device also includes a supply of cleaning or sanitizing fluid and a flowpath which is configured to deliver the cleaning or sanitizing fluid so that it can pass through and clean the product flowpath. To maintain the dispenser in a sanitized state, the product flowpath and surfaces that contact the beverage components are routinely cleaned by flushing those surfaces with cleaning fluids at periodical intervals. Nevertheless, in such systems certain areas are still found difficult to clean.

SUMMARY OF THE INVENTION

The present invention is directed to a beverage dispenser and more specifically to an assembly within the dispenser for mixing beverage components and optionally whipping the beverage product into a foam. The assembly includes a cleaning system that provides thorough cleaning of all surfaces that contact the beverage product or its components.

The assembly contains a bowl that is covered by a lid. A liquid flow path passes through the lid allowing for the entry of liquids, such as milk, from an external source such as a reservoir. The lid also contains a conduit which preferably can be positioned at or near the highest point of the lid. The conduit provides a route for draining the mixing bowl when a sufficient amount of a cleaning or rinsing solution is introduced into the bowl. The bowl preferably also contains a whipping mechanism which can be positioned in the product flow path such that the product can be whipped into a foam as it passes from the bowl through an outlet and into a product delivery conduit that can lead directly to a dispenser nozzle. The whipping mechanism provides for whipping of certain beverage products when desired, especially those beverages that contain dairy components which can be whipped into a foam prior to dispensing. The assembly also preferably includes a cleaning system so that beverage contact surfaces can be thoroughly cleaned with a cleaning fluid.

In an embodiment of the assembly, the lid forms a seal with the bowl.

In an embodiment of the assembly, the external liquid source is a reservoir in fluid connection with the bowl.

In an embodiment of the assembly, the bowl is further configured with a second inlet for delivering cleaning solution.

In an embodiment of the assembly, the liquid flow path in the lid block is used to introduce liquid dairy product into the bowl.

In an embodiment of the assembly, the liquid flow path in the lid block is also used to introduce a cleaning solution into the bowl.

In an embodiment of the assembly, the bowl is a mixing bowl.

In an embodiment, the assembly is housed in a dispensing device.

In an embodiment, the lid further supports a fitment interface connection thereon for connecting of a removable product source.

The invention also provides methods for dispensing a beverage product. In one method a beverage dispenser is provided that contains the bowl assembly with a lid thereon and a dispensing nozzle having a dispensing head is provided. A component of the beverage is introduced into the bowl assembly and the component is passed through an outlet in the assembly directly to a dispensing head of a dispensing nozzle where the product is dispensed.

In one method, an amount of a cleaning solution can be introduced into the bowl assembly until a portion of the cleaning solution exits through a conduit in the lid of the assembly.

In one method, the bowl assembly includes a whipping mechanism driven by a drive shaft; a portion of which is encompassed in a seal housing of a cleaning seal assembly, the method comprises passing cleaning fluid to the seal housing to clean said portion of shaft and housing.

Additional features and advantages of the present invention are described in, and will be apparent from, the following Detailed Description of the Invention and the figures.

DETAILED DESCRIPTION OF THE INVENTION

The present invention is directed to a beverage dispenser and more specifically to an assembly within the dispenser for mixing beverage components and optionally whipping a beverage into a foam. The assembly includes a cleaning system that provides thorough cleaning of all surfaces that contact the beverage product or its components.

Figure 1:
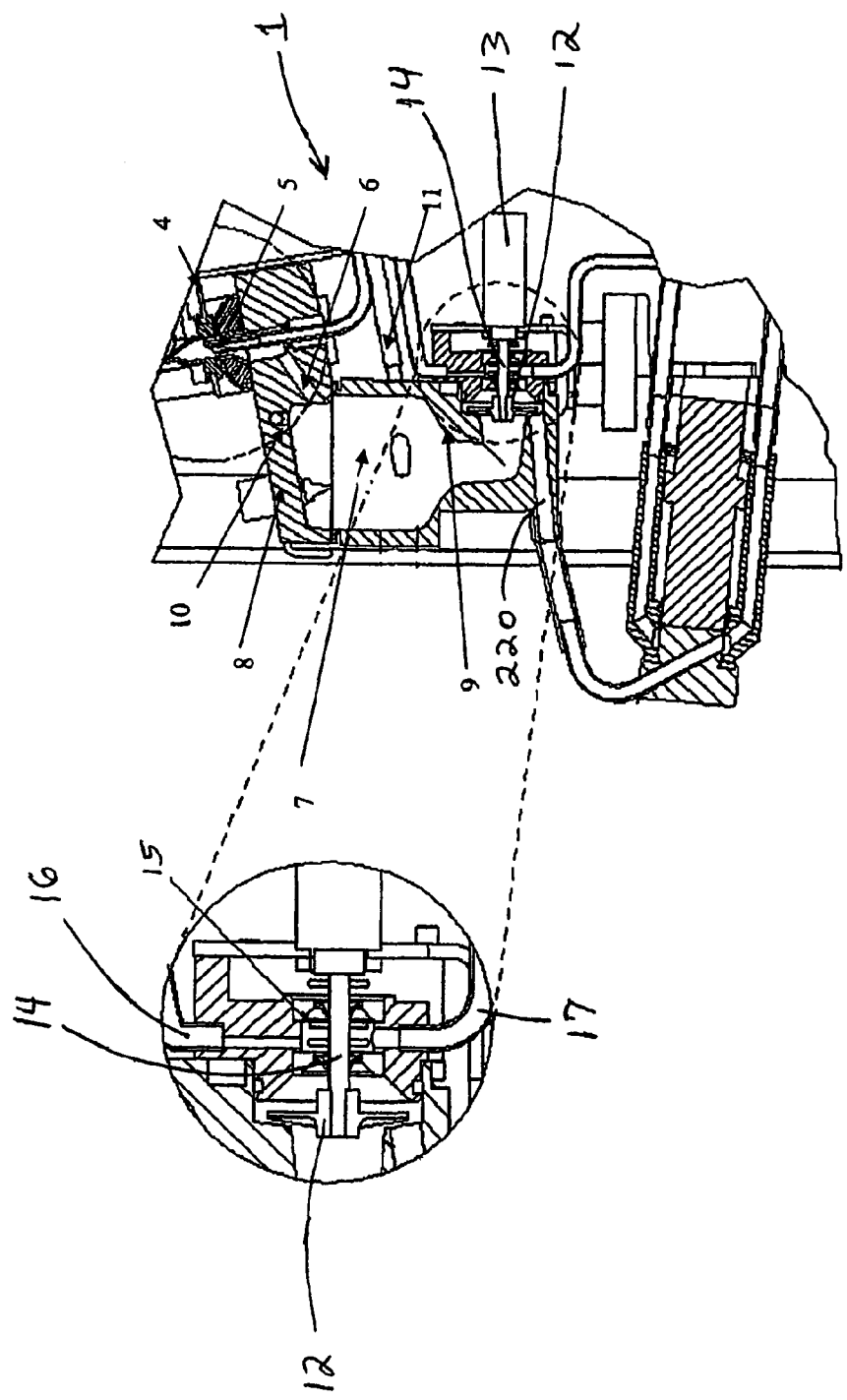
FIG. 1 illustrates a cross-sectional view of an embodiment of the assembly, including the whipping seal assembly and nozzle.

Referring now to the figures and specifically to FIG. 1, an embodiment of mixing assembly 1 is illustrated. The illustrated mixing assembly includes a fitment interface connection 4 on top of a lid block (manifold) 8 for connecting an external product source to a mixing bowl 7. Typically, the external source will be a reservoir containing milk or other beverage. The direct interface of the beverage connection with the top of the lid block (manifold) of the assembly substantially reduces the beverage flow path, as compared to prior devices, and removes an area that would otherwise require cleaning.

Also illustrated in FIG. 1 is a hollow reciprocating spear 5 that can rinse and pierce a membrane seal from an external liquid source and which also assists in cleaning and rinsing the inside of the fitment and milk tube up to a pinch point used to control the flow of liquid from the reservoir. As illustrated, spear 5 can be part of lid block (manifold) 8. The beverage path is short and can be regularly cleaned and rinsed by the clean-in-place assembly. FIG. 1 illustrates conduit 6 which is provided in the lid block and through which milk flows into the bowl 7.

The assembly is closed by lid block (manifold) 8 on top of the mixing bowl 7. In an embodiment, bowl 9 and lid bock (manifold) 8 form a seal. With this novel design, lid block (manifold) 8 is associated with the clean/rinsing function so that the surface of the lid and the entire bowl 9 can be kept clean. Lid block (manifold) 8 contains a conduit 10 which can be positioned at or near its highest point. Conduit 10 serves as a drain for the cleaning/rinsing fluid when the bowl is flooded with a liquid cleaning solution, or any other liquid. The mixing/whipping device can be flooded by stopping the whipper which rotates between 3000 to 30,000 rpm. This creates sufficient restriction to allow bowl 9 to fill with cleaning fluid which can be introduced into the bowl from spear 5 and/or water conduit 11. In this manner all beverage contact surfaces of the fitment and bowl can be cleaned.

In an embodiment the assembly also is capable of cleaning the flowpath side of the assembly where whipper disk 12 connects with motor 13 through drive shaft 14. Previously, this area was a favorable area for residue settling because a perfect seal between the shaft and the back of the whipping housing is difficult to achieve and small amounts of product liquid typically pass into this area. Therefore, the present invention also encompasses compositions and methods for rinsing and sanitizing this area on a regular basis. To this end, buffer zone 15 can be included in the whipping assembly that includes a seal housing traversed by the drive shaft 14; the seal housing and whipping mechanism can then be flushed by introducing a cleaning fluid through conduit 16. Conduit 17 can drain the cleaning fluid from this area. In addition, kick disks can be included in this area to further assist in cleaning and prevent product settling. The whipping is preferably running while the rinsing/sanitizing in this area is carried out.

Figure 2:
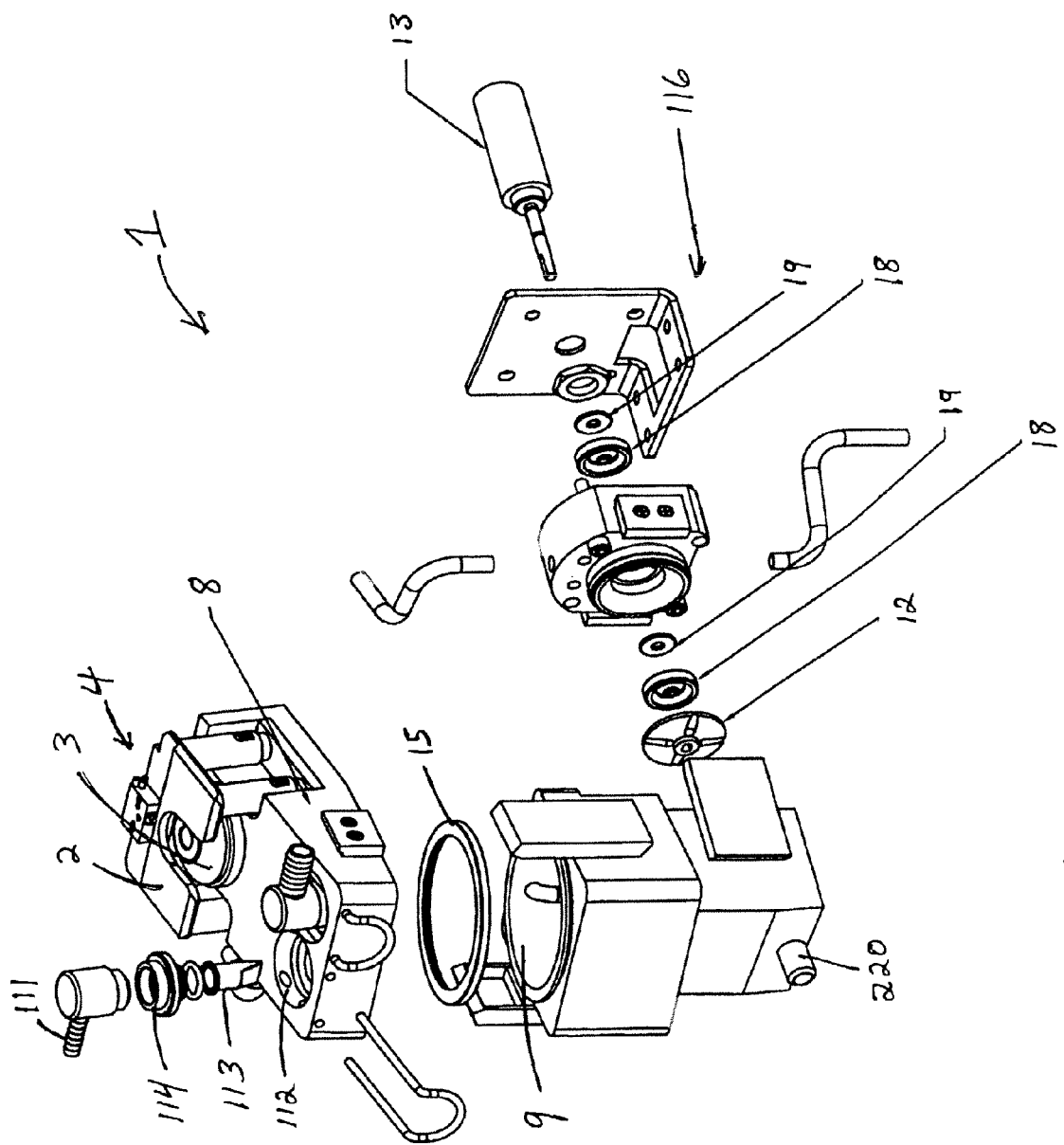
FIG. 2 illustrates an exploded view of an embodiment of the assembly.

FIG. 2 illustrates an exploded view of an embodiment of the mixing assembly. FIG. 2 illustrates fitment connection interface 4 mounted on lid assembly 8. Interface 4 preferably has a wedge shaped support 3 for the fitment and a U-shaped bracket 2. While a pinch clamp closes off the product flow tube in the fluid reservoir, the fitment can slide into bracket 2 and can be forced toward support 3 by a closing mechanism (not illustrated). The material and shape of support 3 can be such that a seal is obtained preventing product leakage. In an embodiment, support 3 can be constructed from two materials, a soft plastic core such as a polypropylene core and a harder covering made of a thermoplastic elastomer such as Santoprene™ made by Advanced Elastomer Systems, LP, an ExxonMobil Chemical Affiliate. This component can be manufactured by injection molding both plastics together.

Lid assembly (manifold) 8 contains inlets for food syrups (e.g., coffee, chocolate). In the illustrated embodiment, two syrup connectors 111 and 112 are provided. These connectors 111 and 112 can be configured with duckbill valves 113 and connectors 114 to prevent unwanted syrup from dripping into bowl 9. A seal 115 can be positioned between lid 8 and bowl 9.

As illustrated, preferably the rear of bowl 9 includes a cleaning/rinsing seal assembly 116. As illustrated, assembly 116 can include a kick disk 18 and seal assembly in relation to whipping motor 13, drive shaft 14 and whipping disk 12.

Figure 3:
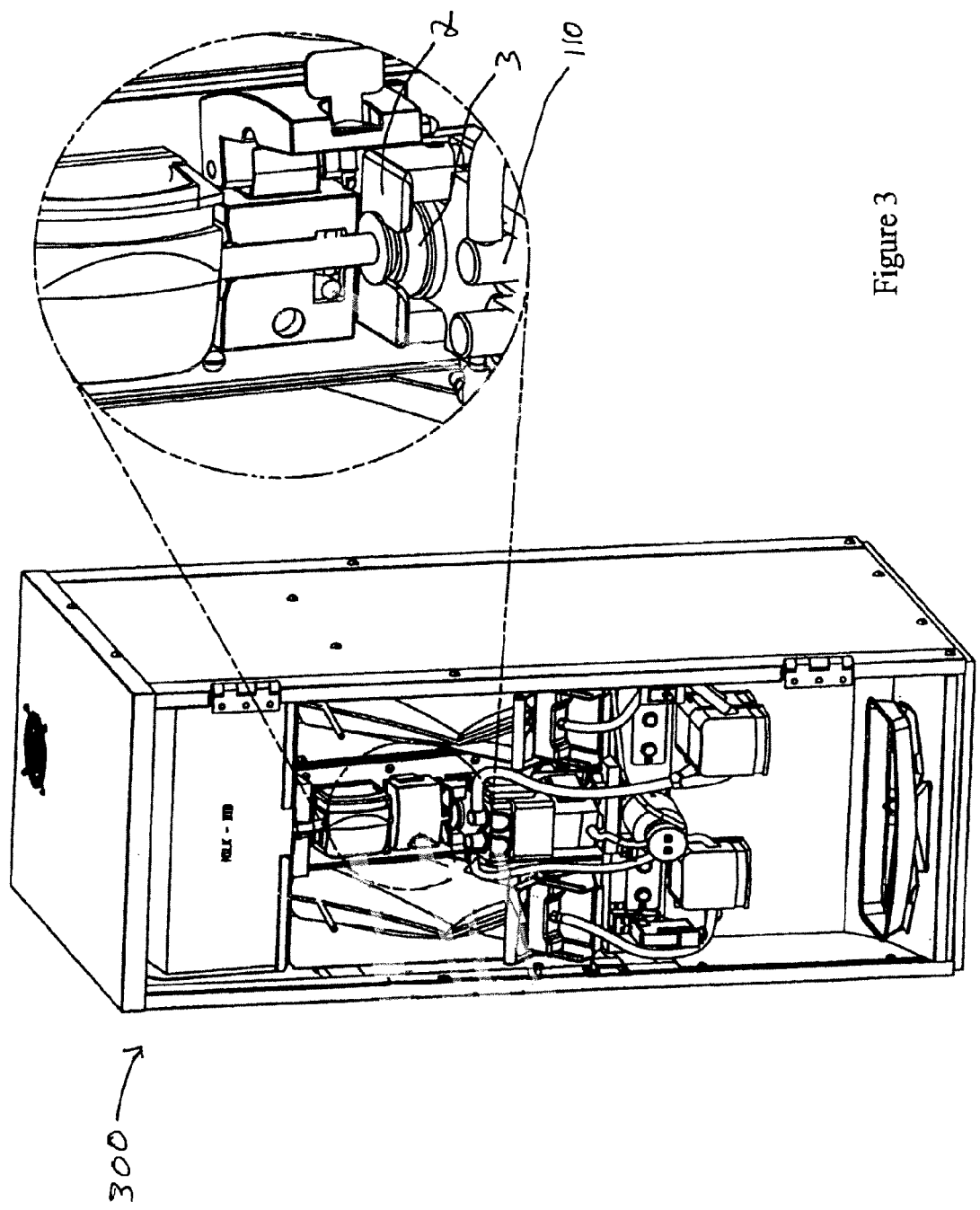
FIG. 3 illustrates a general view of an embodiment of the dispenser when the cover is removed and a detailed view of the pinch clamp and fitment connection for a product bag.

FIG. 3 illustrates an embodiment of a dispenser 300 that is capable of housing the assembly of the present invention. The front cover of the dispenser has been removed. FIG. 3 also illustrates a detailed view of the pinch clamp and fitment connection for a product component bag. The connection interface has a wedge shaped support 3 for the fitment and a U-shaped bracket 2. The fitment is shown in place after being positioned in bracket 2.

Figure 4:
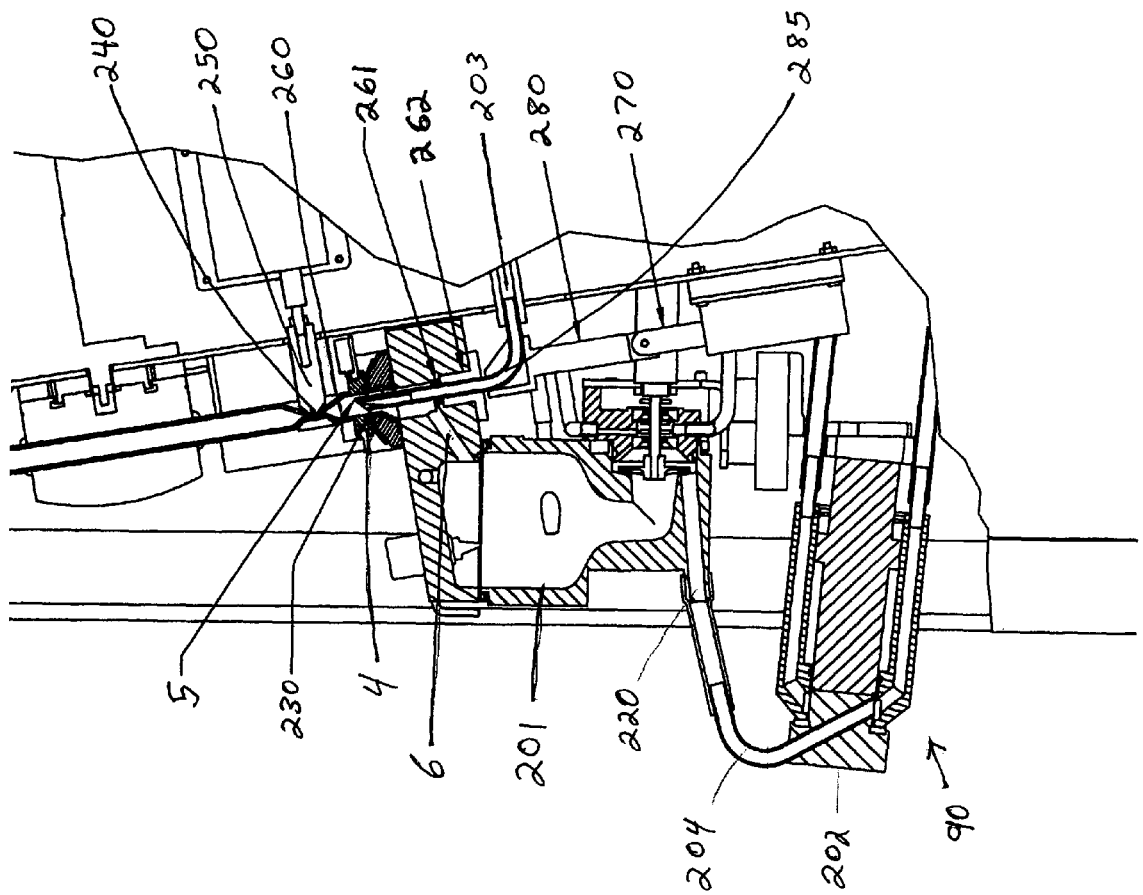
FIG. 4 illustrates a cross-sectional view of an embodiment of the assembly and nozzle and of the fluid flow paths.

FIG. 4 illustrates a cross section of the arrangement of bowl 201 and nozzle 202 in a dispenser. A bowl 201 is located above nozzle 202 in close fluid connection. Bowl 201 receives product flow through product fitment interface 4. The product fitment interface 4 preferably comprises a product fitment which is engaged in a clean-in-place manifold of the assembly. In the illustrated embodiment, reciprocating spear 5 is mounted and sealed within fitment interface 4 through bearing 262 and seal 261. Reciprocating spear 5 is mounted so that it can adopt at least two positions including an extended, piercing position and a retracted non-piercing position. FIG. 4 illustrates spear 5 in the extended piercing position in which membrane 230 of the fitment is pierced to allow product flow into bowl 201 through conduit 6. In this position linear actuator 270 and arm 280 which are joined to spear 5 at elbow 285 are in an extended position. In the retracted position, linear actuator 270, arm 280 and spear 5 are retracted to a position in which spear 5 is non-piercing with respect to the plane of fitment membrane 230. The fitment can be replaced while spear 5 is in the retracted position. Product flow can be controlled by a system which monitors and controls flow through pinch point 240 using a clamp 250, for example. Software and sensors control together timing of the pinch clamp and the milk pump in order to ensure always a positive pressure on the sterile side of the pinch clamp. Such a positive pressure provides an additional level of microbial safety.

Fitment 4 and portion of tube 260 up to the pinch point can be cleaned and rinsed by the clean-in-place system by flushing with cleaning fluid through flow line 203. For instance, a pre-puncture sanitization of the exposed surface of the milk fitment membrane occurs during milk installation to inactivate any microorganisms present on the surface. Hot water from the hot water tank (e.g., 200° F.) is used to flush and sanitize the membrane surface. For instance also, a post-puncture sanitization of the milk tubing up to the pinch clamp can occur immediately following puncture of the fitment closure to flush milk residue from the tubing and ensure that milk is not held beyond the sterile milk zone.

Figure 5:
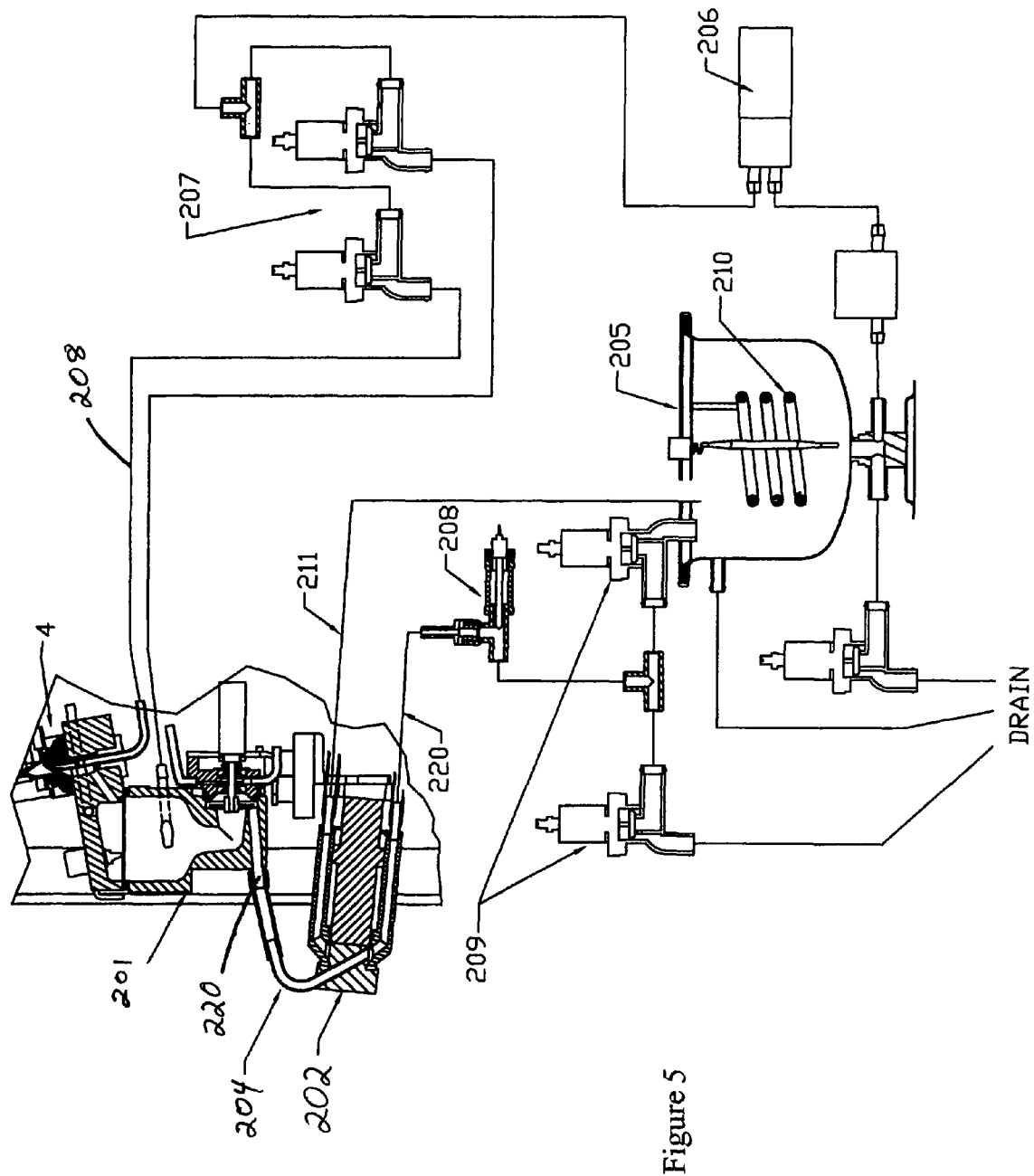
FIG. 5 illustrates an embodiment of clean-in-place recirculation and drain paths.

FIG. 5 illustrates a clean-in-place recirculation and drain path. As illustrated a product outlet 220 is located toward the bottom of bowl 201 which connects the product flowpath from the assembly to the front head of the nozzle 202 through tube 204. The configuration illustrated in FIG. 5 contains a uniquely short flow path connecting bowl 201 to the nozzle head 202.

In an embodiment the cleaning system can include a tank 205 which can contain a heater 210 to heat the cleaning solution such as water to suitable rinsing or sanitizing temperatures. The cleaning or sanitizing fluids can be circulated through the circulation path by a pump 206 to valves 207 where the flow can be diverted to clean the product interface 4 and whipping bowl 9. The fluid can then flow through and clean nozzle 202. From the nozzle, the fluid will flow through the bottom channel to a temperature sensor 208, then a "T" connection which diverts the flow to two valves 209; one which goes to drain, the other which goes back to tank 205 when the fluids are recirculated (e.g., Clean-In-Place or CIP). During CIP the fluid can also flow from the top channel of the nozzle 202 and back to tank 205 (this cleans out the entire nozzle and leaves no air traps) through fluid line 211 and can be recirculated.

Referring again to FIG. 1, fluid can be introduced into bowl 9 from the water inlet 11 situated in the middle of the bowl. The inlet can be positioned such that fluid entry occurs in a tangential direction with respect to the outer circumference of bowl 9 to flush the surface of the bowl and provide sustained kinetic energy to the flushing solution which facilitates cleaning. Some fluid also can accumulate in the bowl from conduit 6 after fitment interface 4 is flushed. As bowl 9 fills to overcapacity, the portion of fluid, in excess of the capacity of the bowl, can exit bowl 9 through conduit 10 in lid 8 and be returned to tank 205 where it can be drained or recirculated, as desired.

In an embodiment of the invention, the assembly is mounted in a food dispenser which can be controlled by a microprocessor to automatically initiate cleaning using the method disclosed above, for example, once a day. Thus, adequate sanitation of the product contact surfaces within the food dispenser can be maintained by using the presently disclosed compositions and methods. For maintenance of a sterile milk zone at the fitment interface, the system can be programmed such that, at the end of each drink dispense cycle, an amount of hot water from the hot water tank (e.g., at 200° F.) is sent through the milk manifold back to the pinch clamp to flush milk residues from the non-sterile zone and inactivates microbes present on the tubing surface.

Additionally, the system can be programmed such that at periodic intervals (e.g., every 2 hours) a cleaning program will automatically initiate to cleanse the milk-dispensing path from just downstream of the pinch clamp and the product reconstitution path including bowl 9, whipping disk 12 and surrounding chamber, and dispensing nozzle 202 with a cleaning solution, such as hot water from the boiler. Suitable water temperatures include temperatures that can sufficiently clean and sanitize the dispenser. Temperatures of about 150° F. or more are typically used, more preferably temperatures of about 175° F. or more, and still more preferably temperatures of about 190° F. or more or 200° F. or more can be used. The system can be programmed such that adequate times and temperatures must be sensed by temperature sensors, such as sensor 208 at the drain inlet, or the system will reinitiate the cleaning process for a predetermined number of attempts, such as 2 attempts. If the time/temperature conditions are not met, a fault can be generated and displayed on the operator panel. Such an "autorinse" operation could also be manually started from an operator panel.

The system can also be programmed such that a timer is set upon the completion of the clean-in-place program. Then, if an operator does not complete a another cleaning cycle within a certain period of time, for example within the following 28 hour, the system could be programmed to initiate a dispensing lockout until a clean-in-place cycle is completed.

By way of example and not limitation, a daily clean-in-place cycle can be as follows:
  Pre-rinse all food product contact surfaces with water having a defined temperature for defined amount of time,
  Clean all contact surfaces with mild cleaning composition such as an alkali detergent or surfactant, and
  Post-rinse all contact surfaces to remove product residues and sanitize the system.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A bowl assembly for a dispensing device, the bowl assembly comprising:
  a bowl having a whipping mechanism positioned at an outlet of the bowl, the bowl adapted to mix and whip a liquid beverage product,
  a lid having a top surface that covers an opening of the bowl such that the lid closes the opening of the bowl, the lid further comprising a conduit that provides a liquid outlet and is connected to a tank that drains or recirculates liquid allowing the liquid to exit the bowl after the liquid has exceeded a capacity of the bowl assembly, and
  a seal positioned between the lid and the bowl for forming a seal between the lid and the bowl.

2. The bowl assembly of claim 1, wherein the lid forms a seal with the bowl.

3. The bowl assembly of claim 1, wherein the conduit is positioned at the highest internal point of the lid.

4. The bowl assembly of claim 1, wherein the bowl contains an outlet that is directly joined to a dispensing head through a tube.

5. The bowl assembly of claim 1, wherein the lid further comprises a flow path for entry of a liquid from an external source.

6. The bowl assembly of claim 1, wherein the lid further comprises a flow path for entry of a liquid from an external source wherein the external source is a reservoir in fluid connection with the lid.

7. The bowl assembly of claim 1, further comprising means for cleaning the bowl assembly.

8. The bowl assembly of claim 1, further comprising at least one inlet for delivering a liquid to the bowl.

9. The bowl assembly of claim 1, wherein the bowl is a mixing bowl.

10. The bowl assembly of claim 1, wherein the lid further comprises a fitment interface connection for connecting an external product source.

11. The bowl assembly of claim 1, wherein the whipping mechanism comprises at least one port that is capable of delivering a liquid to the whipping mechanism.

12. A beverage dispensing device comprising:
an assembly for mixing and whipping a liquid beverage product comprising
a bowl including a whipping mechanism positioned at an outlet of the bowl,
a lid having a top surface that covers an opening of the bowl such that the lid closes the opening of the bowl, the lid further comprising a conduit that provides a liquid outlet and is connected to a tank that drains or recirculates liquid and allows the liquid to exit the bowl after the liquid has exceeded a certain level in the bowl assembly, and
a seal positioned between the lid and the bowl for forming a seal between the lid and the bowl.

13. A bowl assembly for a dispensing device, the bowl assembly comprising:
a bowl adapted to mix and whip a liquid beverage product,
a lid having a top surface that covers an opening of the bowl such that the lid closes the opening of the bowl, and
a seal positioned between the lid and the bowl for forming a seal between the lid and the bowl, the lid further comprising:
at least one flowpath for entry of a liquid product from an external product source and a fitment interface connection for connecting the external product source;
a conduit that provides a liquid outlet and is connected to a tank that drains or recirculates liquid allowing the liquid to exit the bowl after the liquid has exceeded a capacity of the bowl assembly; and
a hollow spear for transporting a cleaning or sanitizing fluid on product contact surfaces of a fitment and tube of the external product source, up to a pinch point as created on the tube by the fitment interface connection.

14. A bowl assembly for a dispensing device, the bowl assembly comprising:
a bowl adapted to mix and whip a liquid beverage product;
a lid having a top surface that covers an opening of the bowl such that the lid closes the opening of the bowl;
a seal positioned between the lid and the bowl for forming a seal between the lid and the bowl;
a whipping mechanism positioned at an outlet of the bowl, wherein the whipping mechanism extends rearwardly of the bowl by a drive shaft; and
a cleaning seal assembly comprising a seal housing, a portion of the drive shaft being encompassed in the seal housing.

15. The bowl assembly of claim 14, wherein the cleaning seal assembly comprises an inlet for receiving a cleaning fluid and an outlet for draining cleaning fluid.

16. A method for dispensing a beverage product, the method comprising:
providing a beverage dispenser having a bowl assembly including a bowl having a whipping mechanism positioned at an outlet of the bowl, the bowl covered by a lid having a top surface covering the bowl, a seal positioned between the lid and the bowl for forming a seal between the lid and the bowl, and a dispensing nozzle having a dispensing head;
introducing a component of the beverage into the bowl assembly;
passing the beverage component through an outlet in the bowl assembly directly to a dispensing head through a tube;
passing the beverage component through the dispensing head;
dispensing the beverage component; and
cleaning the bowl assembly by introducing a cleaning solution into the bowl assembly until the liquid exceeds the internal capacity of the bowl assembly and a portion of the cleaning solution passes through a conduit in the lid of the bowl.

17. The method for dispensing a beverage product of claim 16, wherein the cleaning step occurs automatically at set time intervals.

18. A method for cleaning a beverage product dispenser, the method comprising:
providing a beverage dispenser having a bowl assembly including a bowl having a whipping mechanism positioned at an outlet of the bowl, a lid having a top surface covering the bowl, a seal positioned between the lid and the bowl for forming a seal between the lid and the bowl, and a dispensing nozzle having a dispensing head;
passing a sufficient amount of a cleaning fluid into the bowl assembly until the bowl assembly is completely filled and until a portion of the cleaning fluid passes through an outlet on the lid covering the bowl; and
passing cleaning fluid from the bowl assembly through a tube through a dispensing head.

19. The method for cleaning a beverage product dispenser of claim 18, further comprising the step of introducing cleaning fluid into the bowl assembly from an inlet in the bowl assembly.

20. The method for cleaning a beverage product dispenser of claim 18, further comprising the step of introducing cleaning fluid into the bowl from an inlet in the bowl and from an inlet in a product fitment interface, wherein the product fitment interface connects an external product source to the bowl assembly.

21. The method for cleaning a beverage product dispenser of claim 18, further comprising the step of introducing cleaning fluid into the bowl from an inlet in the bowl, from an inlet in a product fitment interface and from an inlet in a whipping mechanism, wherein the product fitment interface connects an external product source to the bowl assembly.

22. The method for cleaning a beverage product dispenser of claim 18, further comprising the step of automatically passing cleaning fluid into the bowl assembly at set time intervals.

23. The method for cleaning a beverage product dispenser of claim 18, further comprising the step of initiating a dispensing lock out until the cleaning step is completed.

24. A method for cleaning a beverage product dispenser, the method comprising:
providing a beverage dispenser having a bowl assembly including
a bowl,
a lid having a top surface that covers an opening of the bowl such that the lid closes the opening of the bowl,
a seal positioned between the lid and the bowl for forming a seal between the lid and the bowl,
a whipping mechanism positioned at an outlet of the bowl and located at a rear portion of the bowl, wherein the whipping mechanism is driven by a drive shaft, and
a cleaning seal assembly comprising a seal housing, a portion of the drive shaft encompassed in the seal housing; and
passing sufficient cleaning fluid to the seal housing to clean said portion of drive shaft and seal housing.

* * * * *